(12) United States Patent
Kim et al.

(10) Patent No.: US 11,455,014 B2
(45) Date of Patent: Sep. 27, 2022

(54) FOLDABLE DISPLAY DEVICE

(71) Applicant: Samsung Display Co., Ltd., Yongin-si (KR)

(72) Inventors: Hwan Jin Kim, Hwaseong-si (KR); Sang Gu Kim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 167 days.

(21) Appl. No.: 16/364,879

(22) Filed: Mar. 26, 2019

(65) Prior Publication Data

US 2019/0346883 A1    Nov. 14, 2019

(30) Foreign Application Priority Data

May 14, 2018  (KR) .................. 10-2018-0054862

(51) Int. Cl.
*G06F 1/16* (2006.01)
*H04M 1/02* (2006.01)

(52) U.S. Cl.
CPC .......... *G06F 1/1641* (2013.01); *G06F 1/1652* (2013.01); *H04M 1/0268* (2013.01)

(58) Field of Classification Search
CPC .............................. G06F 1/1641; G06F 1/1652
See application file for complete search history.

(56) References Cited

U.S. PATENT DOCUMENTS

| | | | |
|---|---|---|---|
| 7,365,730 B2 | 4/2008 | Suzuki | |
| 9,195,358 B1* | 11/2015 | Cok | ........ H05K 1/148 |
| 2013/0271378 A1 | 10/2013 | Hulford | |
| 2014/0043226 A1 | 2/2014 | Lee et al. | |
| 2014/0204039 A1 | 7/2014 | Miller | |
| 2018/0033362 A1* | 2/2018 | Yamazaki | .............. G06V 40/19 |
| 2018/0068609 A1 | 3/2018 | Yamazaki et al. | |
| 2018/0107250 A1* | 4/2018 | Cho | ........................ G09F 9/301 |
| 2018/0219162 A1 | 8/2018 | Tang | |
| 2018/0284935 A1* | 10/2018 | Lee | ........................ G06F 1/1652 |
| 2020/0043382 A1* | 2/2020 | Isa | ........................ G06F 3/044 |

FOREIGN PATENT DOCUMENTS

| | | |
|---|---|---|
| CN | 1580907 A | 2/2005 |
| CN | 101806962 A | 8/2010 |
| CN | 103576973 A | 2/2014 |

(Continued)

OTHER PUBLICATIONS

Office action dated Jun. 6, 2022, in corresponding CN Application No. 201910396772.4, 16pp.

*Primary Examiner* — Carolyn R Edwards
(74) *Attorney, Agent, or Firm* — Lewis Roca Rothgerber Christie LLP (57) ABSTRACT

Provided is a foldable display device. The foldable display device includes a housing comprising a folding area, a first unfolding area adjacent to the folding area, and a second unfolding area adjacent to the folding area and under the first unfolding area; a display panel located at the first unfolding area and the second unfolding area that is capable of providing light through a first surface and a second surface opposite the first surface; a shutter layer on the display panel in the first unfolding area that controls whether light is transmitted; a window on the shutter layer; and a shielding layer located at the second unfolding area that is capable of blocking the light.

18 Claims, 10 Drawing Sheets

(56) References Cited

FOREIGN PATENT DOCUMENTS

| | | |
|---|---|---|
| CN | 106024839 A | 10/2016 |
| CN | 206212072 U | 5/2017 |
| CN | 107204357 A | 9/2017 |
| CN | 107390504 A | 11/2017 |
| CN | 107797958 A | 3/2018 |
| CN | 107979668 A | 5/2018 |
| CN | 108021191 A | 5/2018 |
| KR | 10-2017-0139740 A | 12/2017 |

* cited by examiner

FOLDABLE DISPLAY DEVICE

CROSS-REFERENCE TO RELATED APPLICATION

This application claims priority to and the benefit of Korean Patent Application No. 10-2018-0054862, filed on May 14, 2018, in the Korean Intellectual Property Office, the entire content of which is incorporated herein by reference.

BACKGROUND

1. Field

Embodiments of the present disclosure relate to a foldable display device, and for example, to a foldable display device capable of displaying an image on the inside and the outside of the device using a single display panel and having improved product reliability.

2. Description of the Related Art

A display device is a device for displaying an image and includes a display panel such as an organic light emitting display panel or a liquid crystal display panel. Currently, bendable display devices are being researched. A foldable display device, which is one of the bendable display devices, is designed to be folded, unlike a flat panel display device.

However, when the display device is folded, tensile stress and compressive stress are applied to elements of the display device. Therefore, the elements of the foldable display device should be designed in consideration of these stresses in order to develop a reliable foldable display device.

SUMMARY

Aspects of embodiments of the present disclosure provide a foldable display device which can be miniaturized and has improved reliability.

However, aspects of embodiments of the present disclosure are not restricted to the one set forth herein. The above and other aspects of embodiments of the present disclosure will become more apparent to one of ordinary skill in the art to which the present disclosure pertains by referencing the detailed description of the present disclosure given below.

An embodiment of a foldable display device includes a housing which comprises a folding area, a first unfolding area disposed adjacent to the folding area, and a second unfolding area disposed adjacent to the folding area and under the first unfolding area; a display panel which is disposed in the first unfolding area and the second unfolding area and provides light through a first surface and a second surface opposite the first surface; a shutter layer which is disposed on the display panel in the first unfolding area and determines whether to transmit light; a window which is disposed on the shutter layer; and a shielding layer which is disposed in the second unfolding area and blocks the light.

An embodiment of a foldable display device includes a housing which comprises a first area and a second area horizontally adjacent to each other; a display panel which is disposed over the first area and the second area and provides light through a first surface and a second surface opposite the first surface; a shutter layer which is disposed on the second surface of the display panel in the first area and determines whether to transmit the light; a shielding layer which is disposed on the second surface of the display panel in the second area and blocks the light; and a window which is disposed in the first area and not in the second area.

BRIEF DESCRIPTION OF THE DRAWINGS

These and/or other aspects of embodiments will become apparent and more readily appreciated from the following description of the embodiments, taken in conjunction with the accompanying drawings in which.

DETAILED DESCRIPTION

The subject matter of the present disclosure will now be described more fully hereinafter with reference to the accompanying drawings, in which example embodiments of the present disclosure are shown. The subject matter of this disclosure may, however, be embodied in different forms and should not be construed as being limited to the embodiments set forth herein. Rather, these embodiments are provided so that this disclosure will be thorough and complete, and will fully convey the scope of the present disclosure to those skilled in the art. The same reference numbers indicate the same components throughout the present disclosure. In the attached figures, the thickness of layers and regions may be exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Although the terms "first", "second", etc. may be used herein to describe various elements, these elements, should not be limited by these terms. These terms may be used to distinguish one element from another element. Thus, a first element discussed below may be termed a second element without departing from the spirit and scope of the present disclosure. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

Hereinafter, exemplary embodiments of the present disclosure will be described with reference to the accompanying drawings.

Figure 1:
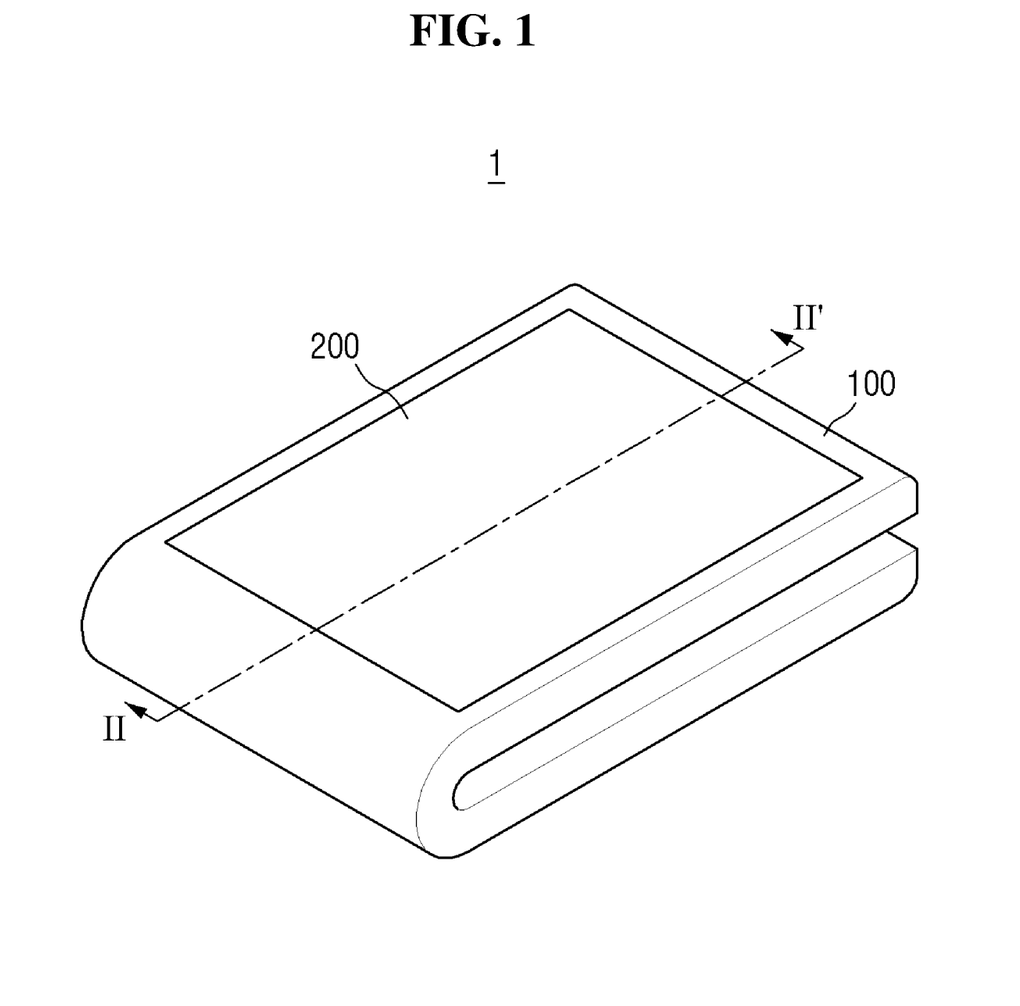
FIG. 1 is a perspective view of a foldable display device according to embodiments of the present disclosure.
Figure 2:
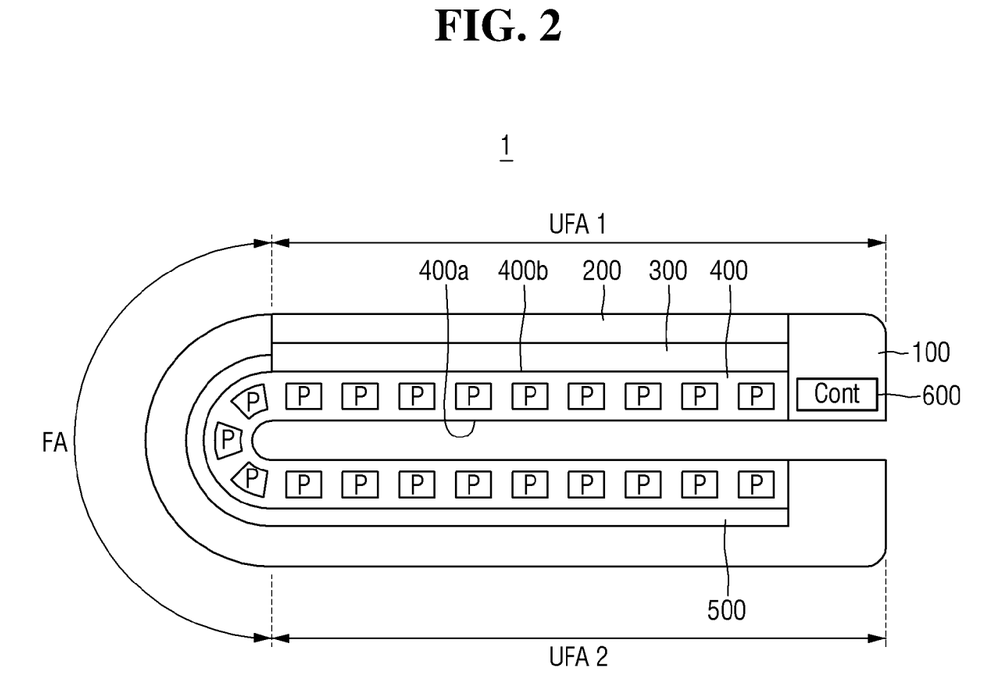
FIG. 2 is a cross-sectional view taken along line II-II' of FIG. 1.
Figure 3:
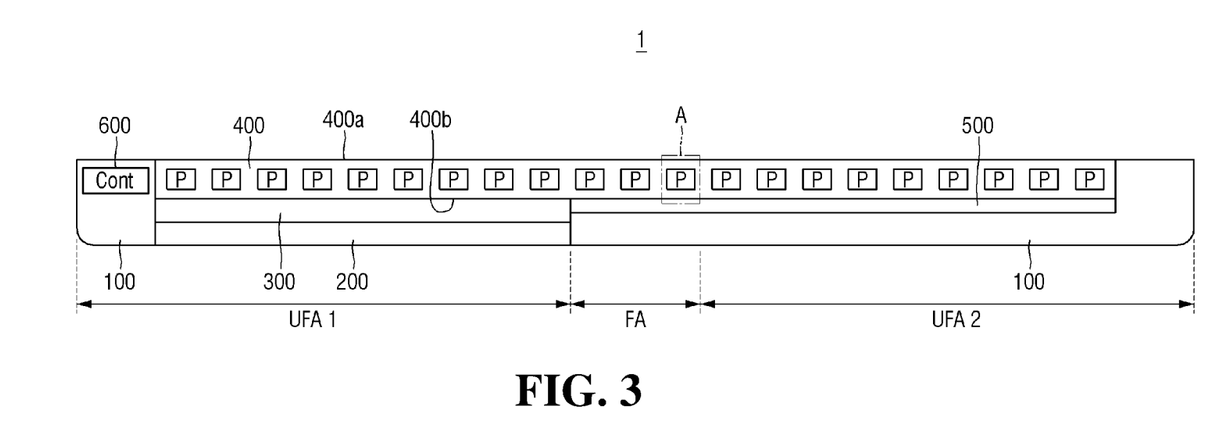
FIG. 3 is a cross-sectional view taken along line II-II' of FIG. 1 in an unfolding mode (e.g., an unfolded state)

FIG. 1 is a perspective view of a foldable display device 1 according to embodiments. FIG. 2 is a cross-sectional view taken along line II-II' of FIG. 1. FIG. 3 is a cross-sectional view taken along line II-II' of FIG. 1 in an unfolding mode.

Referring to FIGS. 1-3, the foldable display device 1 includes a housing 100, a window 200, a shutter layer 300, a display panel 400, and a shielding layer 500. Here, the foldable display device 1 may refer to a display device, a part of which can be folded or unfolded. A state in which a part of a device is folded will be described as a folding mode (e.g., a folded state), and a state in which a part of the device is unfolded will be described as an unfolding mode (e.g., an unfolded state).

The housing 100 may include a folding area FA (e.g., a folded area) and unfolding areas UFA1 and UFA2 (e.g., unfolded areas). The folding area FA may be an area that is bent or folded in the folding mode, and the unfolding areas UFA1 and UFA2 may be areas that are not bent or folded in the folding mode.

The unfolding areas UFA1 and UFA2 may include a first unfolding area UFA1 (e.g., a first unfolded area) disposed on a side of the folding area FA and a second unfolding area UFA2 (e.g., a second unfolded area) disposed on the other side of the folding area FA. The first unfolding area UFA1 and the second unfolding area UFA2 may have a vertical relationship in the folding mode.

For example, referring to FIG. 3, in the unfolding mode, the first unfolding area UFA1 may be disposed on a left side of the folding area FA, and the second unfolding area UFA2 may be disposed on a right side of the folding area FA. Referring to FIG. 2, in the folding mode, the first unfolding area UFA1 may be disposed above the second unfolding area UFA2.

The display panel 400 may be disposed in the first unfolding area UFA1 and the second unfolding area UFA2. In some embodiments, the display panel 400 may extend from the first unfolding area UFA1 to the second unfolding area UFA2 via the folding area FA, as illustrated in FIGS. 2-3. In this case, it is not necessary to use two or more display panels to operate the display device 1, and only one display panel 400 may be used.

When the display panel 400 extends from the first unfolding area UFA1 to the second unfolding area UFA2 via the folding area FA, a part of the display panel 400 may be folded as illustrated in FIG. 2 in the folding mode. Accordingly, in the folding mode, a first surface 400a of the display panel 400 disposed in the first unfolding area UFA1 may be placed to face the first surface 400a of the display panel 400 disposed in the second unfolding area UFA2.

The display panel 400 may include the first surface 400a and a second surface 400b opposite the first surface 400a. The display panel 400 may include a plurality of pixel regions P and may provide light generated or provided by each pixel region P to the outside through the first surface 400a and the second surface 400b. In other words, in some embodiments, the display panel 400 may be a double-sided light emitting display panel.

The display panel 400 may be configured to provide light through the first surface 400a and the second surface 400b according to an electrical signal including a selection signal, a data signal, etc. In some embodiments, the display panel 400 may be an organic light emitting display panel. Although embodiments will be described below based on an arrangement where the display panel 400 is an organic light emitting display panel, the display panel 400 is not limited to the organic light emitting display panel.

The display panel 400 may include, for example, a flexible film such as a plastic film and may include an organic light emitting diode and a pixel circuit disposed on the flexible film. The configuration of the display panel 400 as an organic light emitting display panel will now be described in more detail with reference to FIG. 4.

Figure 4:
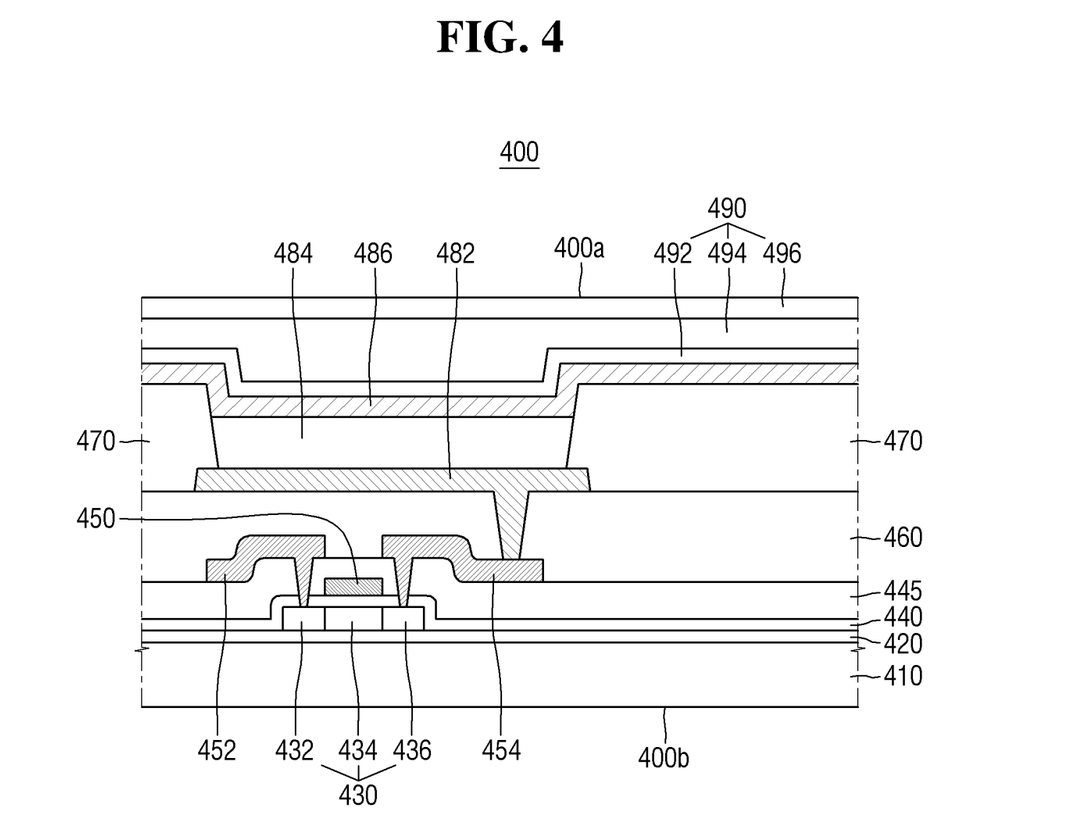
FIG. 4 is a cross-sectional view of a region A of FIG. 3.

FIG. 4 is a cross-sectional view of a region A of FIG. 3.

Referring to FIGS. 3-4, the display panel 400 may include a plurality of pixel regions P, each including a driving transistor (430 and 450) and an organic light emitting element (482, 484, and 486). The organic light emitting element (482, 484, and 486) can be deposited at a relatively low temperature, has low power consumption, and can realize high luminance. Therefore, the organic light emitting element (482, 484 and 486) can be applied to a flexible display device such as a foldable display device or a rollable display device. Each of the pixel regions P is a basic unit for displaying an image, and the display panel 400 may display an image through the pixel regions P. In some embodiments, the pixel regions P may be defined by a pixel defining layer 470 to be described later.

Although only the driving transistor (430 and 450) is illustrated in FIG. 4, at least one selection transistor, at least one capacitor, and at least one driving transistor (430 and 450) can be provided to drive the organic light emitting element (482, 484, and 486).

A substrate 410 may be made of a flexible material. An example of the flexible material is a plastic material. For example, the substrate 410 may be made of any one selected from kapton, polyethersulphone, polycarbonate, polyimide, polyethylene terephthalate (PET), polyethylene naphthalate (PEN), polyacrylate (PAR), and fiber reinforced plastic (FRP).

In some embodiments, the substrate 410 may have a thickness of about 5 μm to about 200 μm. A thickness of about 200 μm or less enables the substrate 410 to maintain flexible characteristics. A thickness of about 5 μm or more enables the substrate 410 to stably support the organic light emitting element (482, 484, and 486).

A buffer layer 420 may be disposed on the substrate 410. The buffer layer 420 may prevent or reduce penetration of impurity elements and/or may planarize the surface. The buffer layer 420 may be made of any one selected from, for example, a silicon nitride (SiNx) layer, a silicon oxide (SiO$_2$) layer, and a silicon oxynitride (SiOxNy) layer. However, the buffer layer 420 is optional and may be omitted depending on the type (or composition) of the substrate 410 and element manufacturing process conditions.

A semiconductor layer 430 may be disposed on the buffer layer 420. The semiconductor layer 430 may include any one of a polycrystalline silicon layer (poly Si), an amorphous silicon layer (amorphous Si), and an oxide semiconductor such as indium-gallium-zinc oxide (IGZO) or indium zinc tin oxide (IZTO). For example, when the semiconductor layer 430 includes a polycrystalline silicon layer, it may include a channel region 434 which is not doped with impurities and a source region 432 and a drain region 436 which are formed on both sides of the channel region 434 and doped with impurities.

The type (or composition) of impurities used to dope the source region 432 and the drain region 436 may vary depending on the type (or kind) of the driving transistor (430 and 450). In some embodiments, a P-type transistor having the source region 432 and the drain region 436 doped with P-type impurities may be used as the driving transistor (430 and 450).

A gate insulating layer 440 may be disposed between the semiconductor layer 430 and a gate electrode 450. The gate insulating layer 440 may include an insulating layer. For example, the gate insulating layer 440 may include at least one of silicon nitride (SiNx) and silicon oxide ($SiO_2$). In some embodiments, the gate insulating layer 440 may be formed as a single layer, or as a multilayer structure such as a double layer, instead of a single layer.

The gate electrode 450 may be disposed on the gate insulating layer 440. The gate electrode 450 may extend in a direction to be coupled to (e.g., connected to) a gate wiring. The gate electrode 450 may overlap the channel region 434. The gate electrode 450 may include at least one of, for example, molybdenum (Mo), chromium (Cr), and tungsten (W). In addition, a first electrode of a capacitor may be disposed on the gate insulating layer 440.

An interlayer insulating film 445 may be disposed on the gate electrode 450. The interlayer insulating film 445 may completely cover the gate electrode 450. Like the gate insulating layer 440, the interlayer insulating film 445 may include, but is not limited to, silicon nitride (SiNx), silicon oxide (SiOx), or tetraethoxysilane (TEOS).

A data wiring including a source electrode 452 and a drain electrode 454 may be disposed on the interlayer insulating film 445. A second electrode of the capacitor may be disposed on the interlayer insulating film 445.

The source electrode 452 and the drain electrode 454 may be coupled to (e.g., connected to) the source region 432 and the drain region 436 through via holes formed in the gate insulating layer 440 and the interlayer insulating film 445, respectively. Here, vias may be formed in the via holes to couple (e.g., connect) the source electrode 452 and the drain electrode 454 to the source region 432 and the drain region 436, respectively, as illustrated in the drawing.

The drain electrode 454 may be coupled to (e.g., connected to) a pixel electrode 482 of the organic light emitting element (482, 484 and 486) through a via formed in a planarization layer 460.

The driving transistor (430 and 450) may provide the pixel electrode 482 with a driving signal for causing a light emitting layer 484 of the organic light emitting element (482, 484 and 486) in a selected pixel region P to emit light.

For example, a voltage corresponding to a difference between a data voltage provided from a data line and a common voltage provided from a common power supply line is stored in the capacitor, and a driving current corresponding to the voltage stored in the capacitor flows to the organic light emitting element (482, 484 and 486) through the driving transistor (430 and 450). As a result, the organic light emitting element (482, 484 and 486) may emit light.

The planarization layer 460 may be disposed on the interlayer insulating film 445 to cover the source electrode 452 and the drain electrode 454. The planarization layer 460 may remove a step and planarize the surface in order to increase the luminous efficiency of the organic light emitting element (482, 484 and 486) disposed on the planarization layer 460. The planarization layer 460 may include one or more of, for example, polyacrylates resin, epoxy resin, phenolic resin, polyamides resin, polyimides resin, unsaturated polyesters resin, polyphenylenethers resin, polyphenylenesulfides resin, and benzocyclobutene (BCB).

The pixel electrode 482 of the organic light emitting element (482, 484 and 486) may be disposed on the planarization layer 460. The pixel electrode 482 may be electrically coupled to (e.g., electrically connected to) the drain electrode 454 through the via formed in the planarization layer 460.

The pixel defining layer 470 may expose a portion of the pixel electrode 482. The pixel defining layer 470 may define the pixel regions P, and the pixel electrode 482 may be disposed to correspond to each pixel region P by the pixel defining layer 470.

The pixel defining layer 470 may include resin such as polyacrylates resin or polyimides resin.

The light emitting layer 484 may be disposed on the pixel electrode 482 in each pixel region P, and a common electrode 486 may be disposed on the pixel defining layer 470 and the light emitting layer 484. The light emitting layer 484 may be made of a low molecular organic material or a high molecular organic material. The light emitting layer 484 may include a hole injection layer (HIL) and a hole transporting layer (HTL) disposed adjacent to the pixel electrode 482. In addition, the light emitting layer 484 may include an electron transporting layer (ETL) and an electron injection layer (EIL) disposed adjacent to the common electrode 486.

In some embodiments, each of the pixel electrode 482 and the common electrode 486 may be formed as a transmissive electrode or a transflective electrode. Accordingly, light generated by the light emitting layer 484 may be provided to the outside through the first surface 400a and the second surface 400b of the display panel 400.

To form a transmissive electrode, for example, transparent conductive oxide (TCO) may be used. Examples of the transparent conductive oxide (TCO) include indium tin oxide (ITO), indium zinc oxide (IZO), zinc oxide (ZnO), and indium oxide ($In_2O_3$).

To form a transflective electrode, for example, a metal, such as magnesium (Mg), silver (Ag), gold (Au), calcium (Ca), lithium (Li), chromium (Cr), aluminum (Al) or copper (Cu), or an alloy of these metals may be used. Here, each of the pixel electrode 482 and the common electrode 486 can be formed as a transflective electrode by suitably adjusting a thickness of the pixel electrode and/or the common electrode. A thinner transflective electrode may have higher light transmittance, but greater resistance. On the other hand, a thicker transflective electrode may have lower light transmittance.

In addition, the transflective electrode may be formed as a multilayer structure including a metal layer made of a metal or a metal alloy and a transparent conductive oxide (TCO) layer stacked on the metal layer.

A thin-film encapsulation layer 490 may be disposed on the common electrode 486. The thin-film encapsulation layer 490 may include inorganic layers 492 and 496 and an organic layer 494. In some embodiments, the thin-film encapsulation layer 490 may have a structure in which the inorganic layers 492 and 496 and the organic layer 494 are alternately stacked. In addition, more inorganic layers and organic layers than those illustrated may also be stacked.

The lower inorganic layer 492 may be disposed closest to the organic light emitting element (482, 484 and 486).

The lower inorganic layer 492 may include one or more inorganic materials selected from $Al_2O_3$, $TiO_2$, ZrO, $SiO_2$, AlON, AlN, SiON, $Si_3N_4$, ZnO, and $Ta_2O_5$. The lower inorganic layer 492 may be formed by, for example, chemical vapor deposition (CVD) or atomic layer deposition (ALD). Accordingly, the lower inorganic layer 492 may be conformally disposed along the shape of the common electrode 486 as illustrated in the drawing. The upper inorganic layer 496 may include the same (e.g., substantially the same) material as the lower inorganic layer 492.

The organic layer 494 may include a polymer-based material. Here, examples of the polymer-based material may include polyacrylates resin, epoxy resin, polyimide, and polyethylene. The organic layer 494 may be formed by a thermal deposition process. Here, the thermal deposition process for forming the organic layer 494 may be performed in a temperature range that does not damage the organic light emitting element (482, 484 and 486).

The densely formed inorganic layers 492 and 496 may mainly play the role of suppressing or reducing the penetration of moisture or oxygen.

The thin-film encapsulation layer 490 may be formed to a thickness of, e.g., about 10 μm or less. Therefore, the overall thickness of the display panel 400 may be very small. The application of the thin-film encapsulation layer 490 can increase or maximize the flexible characteristics of the display panel 400.

Referring again to FIGS. 1-3, the shutter layer 300 may be disposed on the second surface 400b of the display panel 400. An adhesive layer for bonding the display panel 400 and the shutter layer 300 may be formed between the display panel 400 and the shutter layer 300.

The shutter layer 300 may determine (e.g., control) whether to transmit light received from the display panel 400. For example, the shutter layer 300 may determine whether to provide light, which is received through the second surface 400b of the display panel 400 disposed in the first unfolding area UFA1, to a user through the window 200. Accordingly, the shutter layer 300 may be disposed in the first unfolding area UFA1 and may not be disposed in the second unfolding area UFA2.

The shutter layer 300 may employ various suitable elements capable of controlling the transmission of light. In some embodiments, the shutter layer 300 may include a liquid crystal layer. In this case, the position of liquid crystals may be adjusted to control the transmission of light.

The window 200 may cover and protect the shutter layer 300 and the display panel 400.

The window 200 may be made of a transparent material. The window 200 may include, for example, glass or plastic. When the window 200 includes plastic, the window 200 may have a flexible nature.

Examples of plastic that can be applied to the window 200 include, but are not limited to, polyimide, polyacrylate, polymethyl methacrylate (PMMA), polycarbonate (PC), polyethylene naphthalate (PEN), polyvinylidene chloride, polyvinylidene difluoride (PVDF), polystyrene, ethylene vinylalcohol copolymer, polyethersulphone (PES), polyetherimide (PEI), polyphenylene sulfide (PPS), polyallylate, triacetyl cellulose (TAC), and cellulose acetate propionate (CAP). The plastic window 200 may include one or more of the plastic materials listed above.

If the window 200 includes plastic, it may further include a coating layer disposed on upper and lower surfaces of the plastic. In some embodiments, the coating layer may be a hard coating layer including an organic layer and/or an organic-inorganic hybrid layer containing an acrylate compound. The organic layer may include an acrylate compound. The organic-inorganic hybrid layer may be a layer in which an inorganic material such as silicon oxide, zirconium oxide, aluminum oxide, tantalum oxide, niobium oxide, or glass beads is dispersed in an organic material such as an acrylate compound. In some other embodiments, the coating layer may include a metal oxide layer. The metal oxide layer may include, but is not limited to, a metal oxide such as titanium, aluminum, molybdenum, tantalum, copper, indium, tin or tungsten.

A touch member may be further disposed between the window 200 and the display panel 400. The touch member may obtain position information of an input point using a capacitive method, a resistive method, an electromagnetic induction method, an infrared method, or the like.

In addition, a window may also be disposed on the first surface 400a of the display panel 400 to cover and protect the first surface 400a of the display panel 400. The window disposed on the first surface 400a of the display panel 400 may include plastic to have a flexible nature.

The shielding layer 500 may be disposed on the second surface 400b of the display panel 400.

The shielding layer 500 may block light received from the display panel 400. For example, the shielding layer 500 may block light received through the second surface 400b of the display panel 400 disposed in the second unfolding area UFA2. Accordingly, the shielding layer 500 may be disposed in the second unfolding area UFA2 and may not be disposed in the first unfolding area UFA1.

In some embodiments, the shielding layer 500 may extend to the folding area FA along the second surface 400b of the display panel 400 extending to the folding area FA.

The shielding layer 500 may employ various suitable elements capable of blocking light. In some embodiments, the shielding layer 500 may be made of a flexible film coated with a light absorbing material or a light blocking material.

In some embodiments, the foldable display device 1 may include a controller 600 which controls the operation of the shutter layer 300 and the display panel 400 according to an operation mode (for example, the folding mode or the unfolding mode).

Although the controller 600 is illustrated as a single element for ease of description, embodiments are not limited to this arrangement. The controller 600 can also be divided into a plurality of elements, unlike in the present drawings. In addition, although the controller 600 is illustrated as being disposed in the housing 100, embodiments are not limited to this arrangement. In some embodiments, the controller 600 may be implemented through a driving circuit disposed in the housing 100 or may be implemented within the shutter layer 300 and the display panel 400.

The operation of the display device 1 in the folding mode will now be described with reference to FIG. 5.

Figure 5:
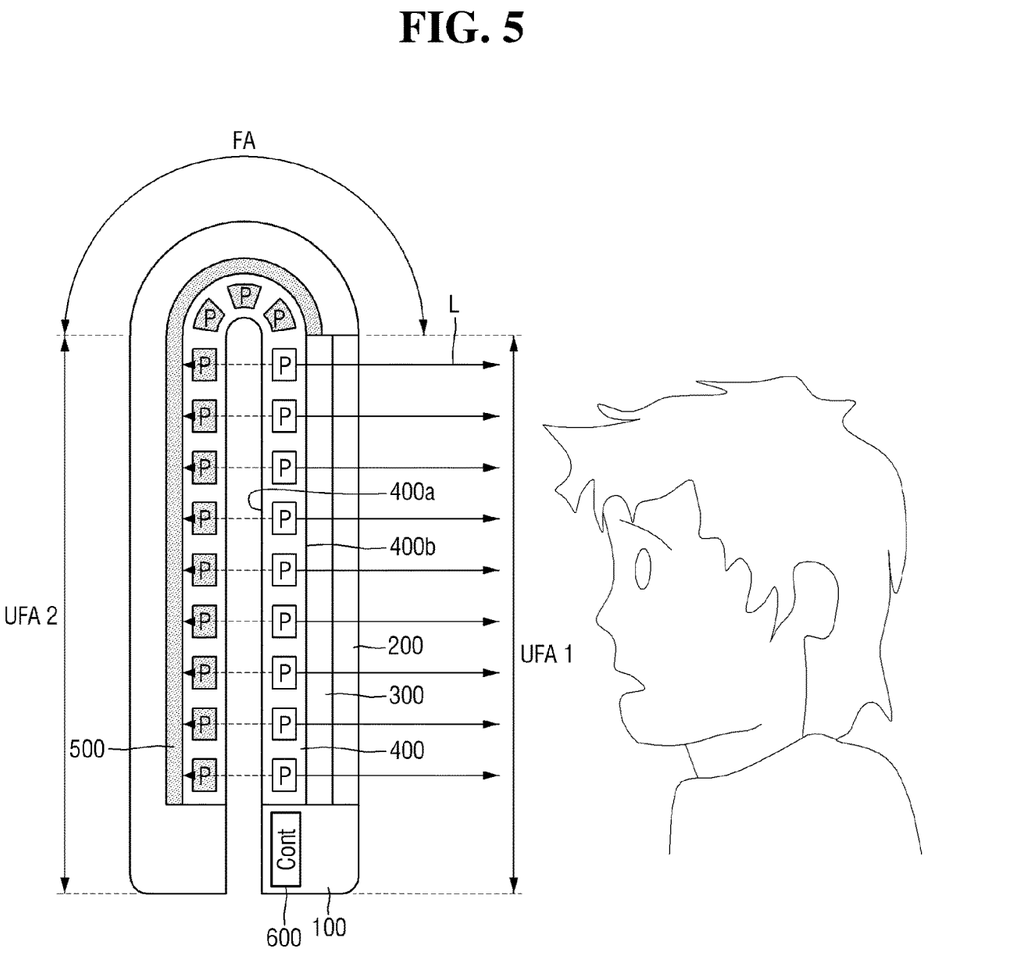
FIG. 5 illustrates the operation of the foldable display device in a folding mode (e.g., a folded state)

FIG. 5 illustrates the operation of the foldable display device 1 in the folding mode.

Referring to FIG. 5, in the folding mode, the controller 600 of the foldable display device 1 may control the display panel 400 disposed in the first unfolding area UFA1 to provide light L and control the display panel 400 disposed in the second unfolding area UFA2 not to provide light L. For example, in the folding mode, the controller 600 may provide a driving current to light emitting elements (e.g., 482, 484 and 486 of FIG. 4) of pixel regions P of the display panel 400 disposed in the first unfolding area UFA1 and may not provide a driving current to light emitting elements (e.g., 482, 484 and 486 of FIG. 4) of pixel regions P of the display panel 400 disposed in the second unfolding area UFA2.

In addition, in the folding mode, the controller 600 may control the shutter layer 300 to transmit light L.

Accordingly, a user may observe an image formed by light L that is provided through the second surface 400b of the display panel 400 disposed in the first unfolding area UFA1 and transmitted through the shutter layer 300. Here, light L provided through the first surface 400a of the display panel 400 disposed in the first unfolding area UFA1 may be blocked by the shielding layer 500. The display panel 400 disposed in the second unfolding area UFA2 may not provide light L.

In some embodiments, the second surface 400b of the display panel 400 may be a bottom surface (see FIG. 4) of the organic light emitting element included in each pixel region P. Accordingly, the user may observe an image formed through bottom emission of the display panel 400.

In some embodiments, in the folding mode, the controller 600 may control the display panel 400 disposed in the folding area FA not to provide light L. For example, in the folding mode, the controller 600 may not provide a driving current to light emitting elements (e.g., 482, 484, and 486 of FIG. 4) of pixel regions P of the display panel 400 disposed in the folding area FA. Accordingly, the display panel 400 disposed in the folding area FA may not provide light L.

The operation of the foldable display device 1 in the unfolding mode will now be described with reference to FIG. 6.

Figure 6:
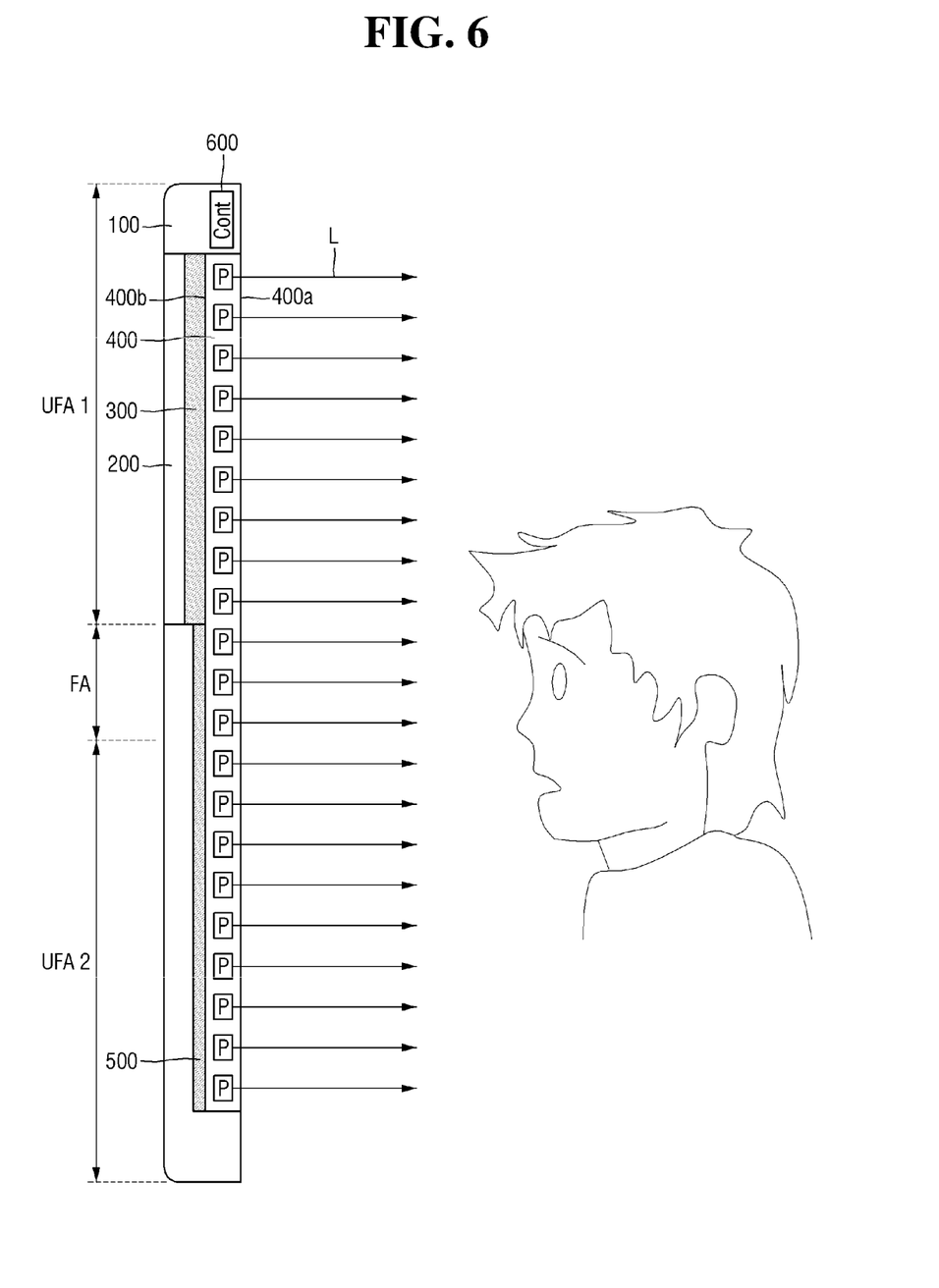
FIG. 6 illustrates the operation of the foldable display device in the unfolding mode (e.g., the unfolded state)

FIG. 6 illustrates the operation of the foldable display device 1 in the unfolding mode.

Referring to FIG. 6, in the unfolding mode, the controller 600 of the display device 1 may control the display panel 400 disposed in both the first unfolding area UFA1 and the second unfolding area UFA2 to provide light L. For example, in the unfolding mode, the controller 600 may provide a driving current to the light emitting elements (e.g., 482, 484 and 486 of FIG. 4) of all pixel regions P of the display panel 400 disposed in the first unfolding area UFA1 and the second unfolding area UFA2.

In addition, in the unfolding mode, the controller 600 may control the shutter layer 300 not to transmit light L.

Accordingly, the user may observe an image formed by light L that is provided through the first surface 400*a* of the display panel 400 disposed in the first unfolding area UFA1 and the second unfolding area UFA2. Here, light L provided through the second surface 400*b* of the display panel 400 disposed in the first unfolding area UFA1 may be blocked by the shutter layer 300, and light L provided through the second surface 400*b* of the display panel 400 disposed in the second unfolding area UFA2 may be blocked by the shielding layer 500.

In some embodiments, the first surface 400*a* of the display panel 400 may be a top surface (see FIG. 4) of the organic light emitting element included in each pixel region P. Accordingly, the user may observe an image formed through top emission of the display panel 400.

In some embodiments, in the unfolding mode, the controller 600 may control the display panel 400 disposed in the folding area FA to provide light L. For example, in the unfolding mode, the controller 600 may control the display panel 400 disposed in the folding area FA to provide light L by providing a driving current to the light emitting elements (e.g., 482, 484, and 486 of FIG. 4) of the pixel regions P of the display panel 400 disposed in the folding area FA.

Figure 7:
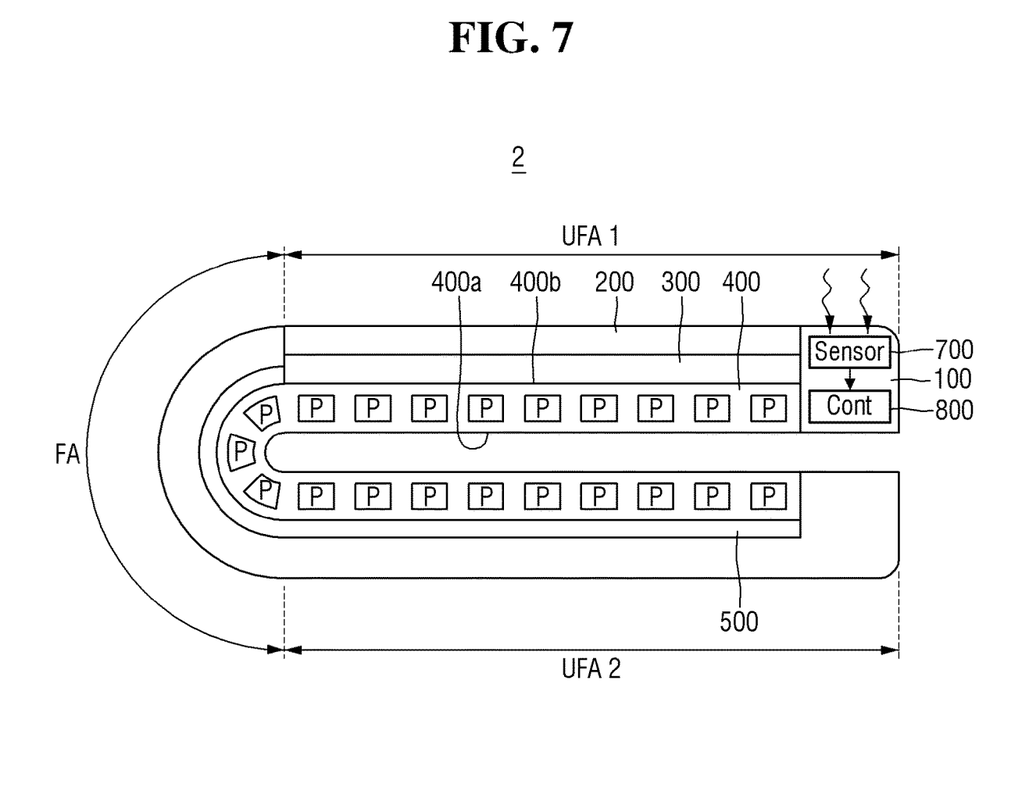
FIG. 7 is a cross-sectional view of a foldable display device according to embodiments of the present disclosure.

FIG. 7 is a cross-sectional view of a foldable display device 2 according to embodiments. A redundant description of elements and features identical to those of the foldable display device 1 described above with reference to FIGS. 1-6 will not be repeated here, and differences will be mainly described.

Referring to FIG. 7, the foldable display device 2 may include an illuminance sensor 700 which senses external illuminance and a controller 800 which controls the operation of a display panel 400 using the sensing result of the illuminance sensor 700. For example, the controller 800 may use the sensing result of the illuminance sensor 700 to control the display panel 400 disposed in a first unfolding area UFA1 and the display panel 400 disposed in a second unfolding area UFA2 to provide or not to provide light, which will be described in more detail herein below.

Although each of the illuminance sensor 700 and the controller 800 is illustrated as a single element for ease of description, embodiments are not limited to this arrangement. Each of the illuminance sensor 700 and the controller 800 can also be divided into a plurality of elements, unlike in the drawing. In addition, although the illuminance sensor 700 and the controller 800 are illustrated as being disposed in a housing 100, embodiments are not limited to this arrangement.

The operation of the foldable display device 2 will now be described with reference to FIGS. 8-9.

Figure 8:
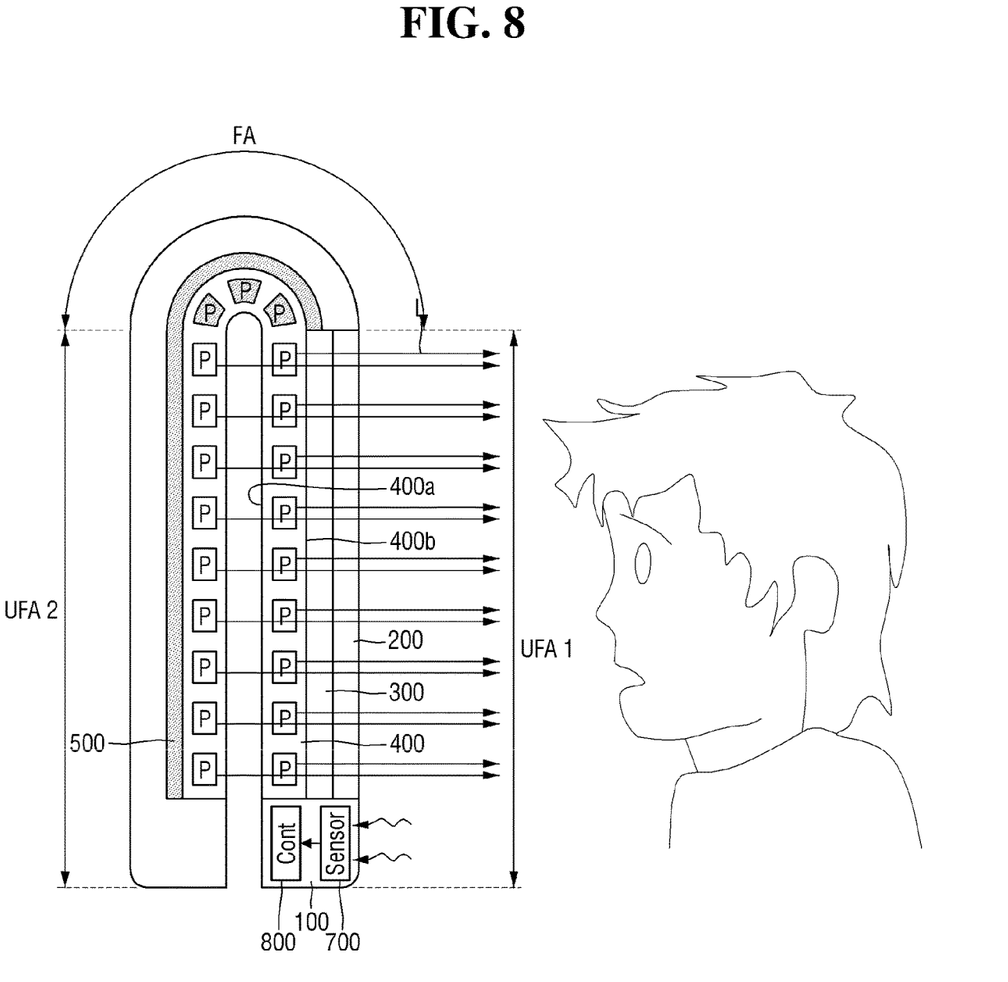
FIGS. 8-9 illustrate the operation of the foldable display device according to illuminance.
Figure 9:
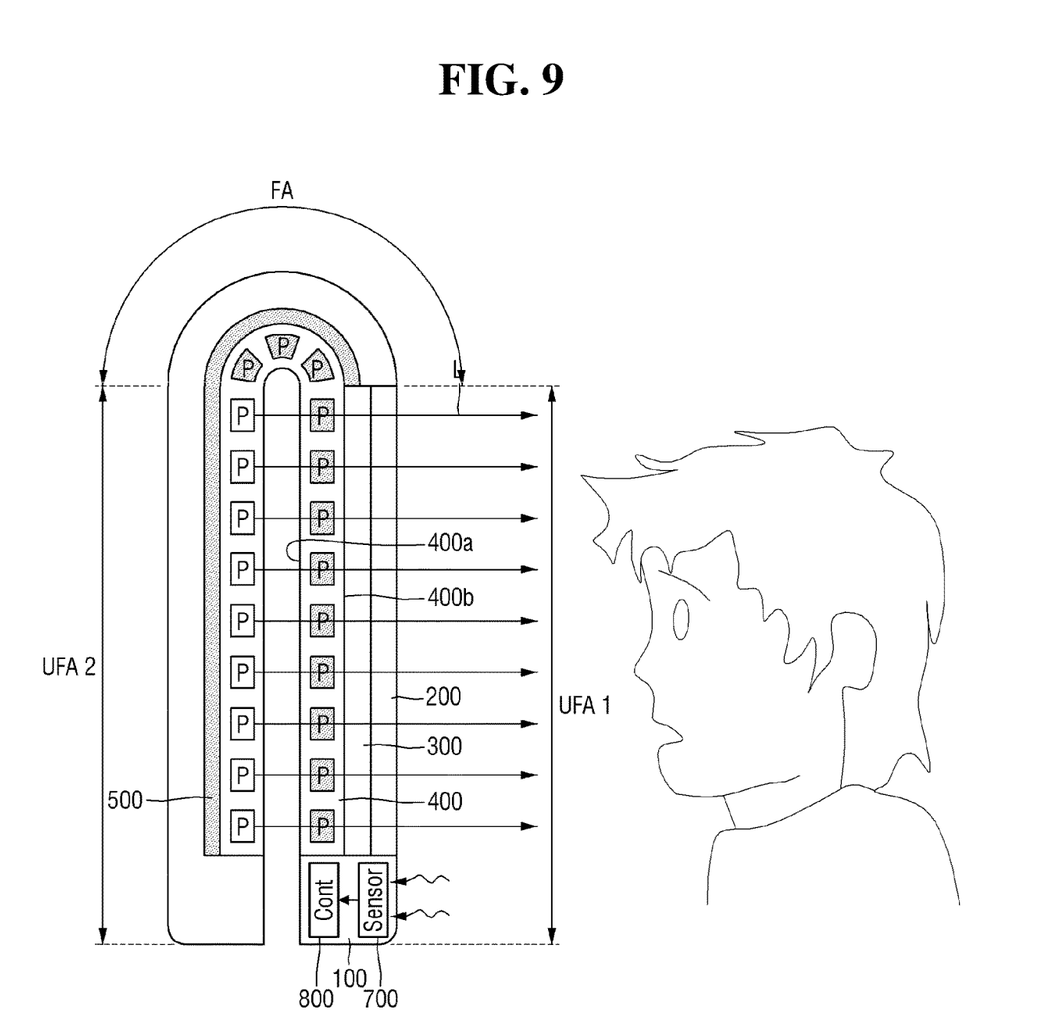

FIGS. 8-9 illustrate the operation of the foldable display device 2 according to illuminance.

Referring to FIG. 8, when ambient illuminance is high, the illuminance sensor 700 may provide a first sensing result to the controller 800. The controller 800 receiving the first sensing result may control the display panel 400 disposed in the first unfolding area UFA1 and the display panel 400 disposed in the second unfolding area UFA2 to provide light L in order to increase the luminance of an image provided to a user. Accordingly, the user may observe a high-luminance image in a bright environment with high illuminance.

Referring to FIG. 9, when ambient illuminance is low, the illuminance sensor 700 may provide a second sensing result to the controller 800. The controller 800 receiving the second sensing result may control the display panel 400 disposed in the first unfolding area UFA1 not to provide light L and control the display panel 400 disposed in the second unfolding area UFA2 to provide light L in order to lower the luminance of an image provided to the user. Since a method of controlling the display panel 400 has been described above, redundant description thereof will not be repeated here.

When the controller 800 controls the display panel 400 disposed in the first unfolding area UFA1 not to provide light L, the display panel 400 disposed in the first unfolding area UFA1 may serve as a transparent panel. Therefore, the user may receive light L from the display panel 400 disposed in the second unfolding area UFA2 via the display panel 400 disposed in the first unfolding area UFA1. As a result, the user may observe an image with lower luminance than that of an image provided in the case described above with reference to FIG. 8. For example, since the user is provided with a low-luminance image in a dark environment with low illuminance, the user's eye fatigue can be reduced.

Until now, a case where the controller 800 controls the display panel 400 disposed in the first unfolding area UFA1 and the display panel 400 disposed in the second unfolding area UFA2 to provide or not to provide light based on the sensing result of the illuminance sensor 700 has been described. However, if necessary, the illuminance sensor 700 may be omitted. For example, in an embodiment, the controller 800 may control the display panel 400 disposed in the first unfolding area UFA1 and the display panel 400 disposed in the second unfolding area UFA2 to provide or not to provide light based on a factor other than illuminance.

Figure 10:
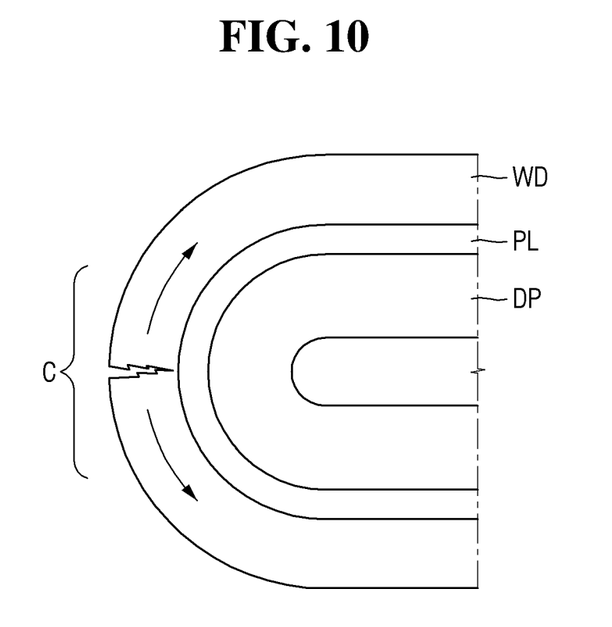
FIG. 10 is a cross-sectional view illustrating the effect of a foldable display device according to embodiments of the present disclosure.

FIG. 10 is a cross-sectional view for illustrating the effect of a foldable display device according to embodiments.

Referring to FIG. 10, when an out-foldable display device is folded, an image disposed on a part of a surface of a display panel DP can be observed. When the out-foldable display device is unfolded, an image disposed on the entire surface of the display panel DP can be observed. In order to implement such an out-foldable display device, an adhesive layer PL and a window WD may be sequentially stacked on the display panel DP as illustrated in the drawing.

In this case, however, product reliability is reduced. To facilitate folding of the display device, the window WD should be made thin. However, if the window WD is thin, it can be easily damaged by external impact due to reduced strength. On the other hand, if the thickness of the window WD is increased to solve this problem, when the display device is folded, tensile stress is concentrated on a folding area C, creating defects such as cracks in the window WD.

However, the foldable display devices 1 and 2 described above do not have such problems even though displaying an image on the inside and the outside of the display devices 1 and 2 using a single display panel. Therefore, the display devices 1 and 2 can be miniaturized, and their reliability can be improved.

A foldable display device according to embodiments displays an image on the inside and the outside of the device using a single display panel. Nonetheless, the foldable display device is not vulnerable to external impact (or the vulnerability to external impact is reduced), nor its window is broken (or the window is less susceptible to damage). Therefore, product reliability can be improved. In addition, since a single display panel is used, the product can be easily miniaturized.

However, the effects of the embodiments are not restricted to the ones set forth herein. The above and other effects of the embodiments will become more apparent to one of ordinary skill in the art to which the embodiments pertain by referencing the claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While subject matter of the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims, and equivalents thereof. The exemplary embodiments should be considered in a descriptive sense only and not for purposes of limitation.

What is claimed is:

1. A foldable display device comprising:
    a housing which comprises a folding area, a first unfolding area adjacent to the folding area, and a second unfolding area adjacent to the folding area and under the first unfolding area;
    a display panel located at the first unfolding area and the second unfolding area and capable of providing light through a first surface and a second surface opposite the first surface;
    a shutter layer on the display panel in the first unfolding area that controls whether light is transmitted;
    a window on the shutter layer; and
    a shielding layer located at the second unfolding area, the shielding layer being configured to block a light provided through the second surface of the display panel completely,
    wherein the shielding layer is formed continuously to cover a plurality of pixels of the display panel located at the second unfolding area, and
    wherein the shielding layer continuously extends from the second unfolding area through the folding area and does not extend into the first unfolding area.

2. The foldable display device of claim 1, wherein the first surface of the display panel located at the first unfolding area faces the first surface of the display panel located at the second unfolding area, and the second surface of the display panel located at the first unfolding area is under the shutter layer.

3. The foldable display device of claim 2, wherein the shielding layer is under the second surface of the display panel disposed in the second unfolding area.

4. A foldable display device comprising:
    a housing which comprises a folding area, a first unfolding area adjacent to the folding area, and a second unfolding area adjacent to the folding area and under the first unfolding area;

a display panel located at the first unfolding area and the second unfolding area and capable of providing light through a first surface and a second surface opposite the first surface;

a shutter layer on the display panel in the first unfolding area that controls whether light is transmitted;

a window on the shutter layer;

a shielding layer located at the second unfolding area that is capable of blocking the light; and a controller that controls the operation of the shutter layer and the display panel according to a mode, wherein the controller, in a folding mode in which the folding area is folded, controls at least one of the display panel located at the first unfolding area and the display panel located at the second unfolding area to provide the light and controls the shutter layer to transmit the light and, in an unfolding mode in which the folding area is not folded, controls both the display panel located at the first unfolding area and the display panel located at the second unfolding area to provide the light and controls the shutter layer not to transmit the light.

5. The foldable display device of claim 4, wherein, in the folding mode, the controller controls any one of the display panel located at the first unfolding area and the display panel located at the second unfolding area to provide the light and controls the other display panel not to provide the light.

6. The foldable display device of claim 5, wherein the display panel comprises a plurality of pixel regions, and the controlling of the any one of the display panel located at the first unfolding area and the display panel located at the second unfolding area to provide the light and the controlling of the other display panel not to provide the light by the controller comprises controlling all of a plurality of pixel regions included in the any one of the display panel located at the first unfolding area and the display panel located at the second unfolding area to provide the light and controlling all of a plurality of pixel regions included in the other display panel not to provide the light.

7. The foldable display device of claim 4, wherein, in the unfolding mode, the controller controls both the display panel located at the first unfolding area and the display panel located at the second unfolding area to provide the light.

8. The foldable display panel of claim 4, wherein the display panel comprises an organic light emitting display panel having an organic light emitting element, and the controlling of the display panel not to provide the light by the controller comprises not providing a driving current to the organic light emitting element.

9. The foldable display device of claim 1, further comprising:

an illuminance sensor that senses external illuminance; and a controller that controls the display panel located at the first unfolding area and the display panel located at the second unfolding area to provide or not to provide the light using the sensing result of the illuminance sensor.

10. The foldable display device of claim 9, wherein the controller, when the sensing result is a first result, controls any one of the display panel located at the first unfolding area and the display panel located at the second unfolding area to provide the light and controls the other display panel not to provide the light and, when the sensing result is a second result different from the first result, controls both the display panel located at the first unfolding area and the display panel located at the second unfolding area to provide the light.

11. A foldable display device comprising:

a housing comprising a first area and a second area horizontally adjacent to each other;

a display panel located over the first area and the second area and capable of providing light through a first surface and a second surface opposite the first surface;

a shutter layer on the second surface of the display panel in the first area that controls whether to transmit the light;

a shielding layer on the second surface of the display panel in the second area, the shielding layer being configured to block a light provided through the second surface of the display panel completely;

a window located at the first area and not the second area; and wherein the shielding layer is formed continuously to cover a plurality of pixels of the display panel located at the second unfolding area, and wherein the shielding layer extends continuously through the second area and does not extend into the first area.

12. The foldable display device of claim 11, wherein the second area comprises a folding area in which the housing and the display panel are folded and an unfolding area in which the housing and the display panel are not folded.

13. The foldable display device of claim 12, wherein, in a folding mode, the first surface of the display panel located at the unfolding area faces the first surface of the display panel located at the first area.

14. The foldable display device of claim 12, further comprising a controller that controls the operation of the shutter layer according to mode, wherein the controller, in an unfolding mode in which the folding area is not folded, controls the shutter layer not to transmit the light and, in the folding mode in which the folding area is folded, controls the shutter layer to transmit the light.

15. The foldable display device of claim 11, wherein the shutter layer is located at the first area and not the second area.

16. The foldable display device of claim 15, wherein the shutter layer is between the window and the display panel.

17. The foldable display device of claim 15, wherein the second area comprises a folding area in which the housing and the display panel are folded and an unfolding area in which the housing and the display panel are not folded, and the shielding layer is over the folding area and the unfolding area.

18. The foldable display device of claim 11, wherein the display panel comprises an organic light emitting display panel comprising an organic light emitting element, a driving transistor for driving the organic light emitting element, and an encapsulation layer for protecting the organic light emitting element, wherein the driving transistor is located closer to the second surface of the display panel than the encapsulation layer.

* * * * *